United States Patent
Yamane et al.

(10) Patent No.: US 10,739,624 B2
(45) Date of Patent: Aug. 11, 2020

(54) OPTICAL CONTROL ELEMENT

(71) Applicant: Sumitomo Osaka Cement Co., Ltd., Tokyo (JP)

(72) Inventors: Yuji Yamane, Tokyo (JP); Tetsuya Fujino, Tokyo (JP); Hideki Ichimei, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/367,762

(22) Filed: Mar. 28, 2019

(65) Prior Publication Data

US 2019/0302491 A1      Oct. 3, 2019

(30) Foreign Application Priority Data

Mar. 29, 2018   (JP) .................. 2018-065343

(51) Int. Cl.
    *G02F 1/035*   (2006.01)
(52) U.S. Cl.
    CPC .......... *G02F 1/035* (2013.01); *G02F 2202/20* (2013.01)

(58) Field of Classification Search
    None
    See application file for complete search history.

(56) References Cited

U.S. PATENT DOCUMENTS

5,526,448 A * 6/1996 Nagata .................... G02F 1/035
                                                   385/1
2018/0039104 A1   2/2018 Hosokawa et al.

OTHER PUBLICATIONS

Nozawa, T. et al., "Water vapor effects on optical characteristics in Ti:LiNbO3 channel waveguides," Applied Optics, vol. 30., No. 9, pp. 1085-1089.

* cited by examiner

*Primary Examiner* — Chad H Smith
(74) *Attorney, Agent, or Firm* — IpHorgan Ltd.

(57) ABSTRACT

An optical control element including an optical waveguide formed by using diffusion of titanium that is formed on a lithium niobate substrate and a control electrode formed on the lithium niobate substrate that is provided in the vicinity of the optical waveguide, in which an amount of a hydroxyl group absorbed into the lithium niobate substrate is set to be in a range of 0.5 to 2.5 cm$^{-1}$.

1 Claim, 1 Drawing Sheet

OPTICAL CONTROL ELEMENT

CROSS-REFERENCE TO RELATED APPLICATIONS

This application claims the benefit of Japanese Patent Application No. 2018-065343 filed Mar. 29, 2018, the disclosure of which is herein incorporated by reference in its entirety.

BACKGROUND OF THE INVENTION

Field of the Invention

The present invention relates to an optical control element and particularly to an optical control element including an optical waveguide formed by using the diffusion of titanium and a control electrode formed on the lithium niobate substrate that is provided in the vicinity of the optical waveguide.

Description of Related Art

In optical communication fields or optical measurement fields, optical control elements such as an optical modulator having an optical waveguide formed by using the diffusion of titanium formed on a lithium niobate substrate (LN substrate) (LN optical modulator) are often used. As a pattern width of a titanium film that is formed on the LN substrate, in the related art, a width of more than 6 µm is employed in consideration of the optical confinement efficiency.

This is because, in an optical waveguide that is formed by the diffusion of titanium, a decrease in the pattern width of the titanium film brings about a small increase in the refractive index at a place of titanium diffusion, and thus optical confinement is weak, and a mode field diameter (MFD) is likely to broaden due to the influence of a change in a manufacturing process. Therefore, a pattern width of the titanium film exceeding 6 µm is often employed.

In recent years, high integration of combining a plurality of optical modulation circuits into one optical control element has been carried out, and it has become necessary to decrease an optical loss. Patent Document 1 proposes the narrowing of the width of a control electrode in order to control the absorption of signal light by the control electrode in an intersection portion between an optical waveguide and the control electrode.

In addition, in a case where an LN optical modulator is highly integrated, in an input portion, an output portion, and an interaction portion with the control electrode of the optical waveguide, a pattern width of the titanium film of 6 µm or less is employed in order to avoid interference with a high-order mode light beam. Therefore, in order to improve the optical loss or the like of the optical control element, a capability of more accurately controlling MFD becomes important.

Additionally, in the manufacturing of the LN optical modulator, there is a problem in that MFD varies even under the same manufacturing conditions and the optical loss increases. As a result of investigating parameters (the width, film thickness, diffusion temperature, diffusion time, and diffusion atmosphere of titanium) of the manufacturing process that affect MFD, it has been clarified that MFD is significantly dependent on an amount of moisture in an electric furnace which is one of the diffusion atmospheres.

Meanwhile, it is generally known that a process gas is humidified and supplied into the electric furnace in order to suppress the diffusion of Li in the substrate to the outside of the substrate during the diffusion of titanium, and there is also a report that the amount of moisture in the electric furnace has an influence on a transmission loss of the optical waveguide (Non-Patent Document 1).

However, in the related art, a pattern width of a titanium film exceeding 6 µm at which light is strongly confined is employed, and thus it has not been generally known that the amount of moisture in the electric furnace has an influence on MFD. In the present invention, it was found that, in a case where the pattern width of the titanium film is set to 6 µm or less, MFD of products significantly varies, and the optical loss becomes particularly significant.

[Patent Document 1] Japanese Patent No. 6107868
[Non-Patent Document 1] T. Nozawa, K. Noguchi, H. Miyazawa and K. Kawano: "Water vapor effects on optical characteristics in Ti: LiNbO3 channel waveguides.", Applied Optics, vol. 30, No. 9, pp. 1085-1089

SUMMARY OF THE INVENTION

An object that the present invention intends to achieve is to solve the above-described problem and provide an optical control element in which variation of MFD is suppressed and an optical loss is small.

In order to achieve the above-described object, an optical control element of the present invention has the following technical characteristics.

(1) An optical control element including an optical waveguide formed by using diffusion of titanium that is formed on a lithium niobate substrate and a control electrode formed on the lithium niobate substrate that is provided in the vicinity of the optical waveguide, in which an amount of a hydroxyl group absorbed into the lithium niobate substrate is set to be in a range of 0.5 to 2.5 $cm^{-1}$ in terms of absorption coefficient.

(2) The optical control element according to (1), in which a pattern width of a titanium film in at least any one of an input portion, an output portion, or an interaction portion with the control electrode of the optical waveguide is 6 µm or less.

(3) The optical control element according to (1) or (2), in which a thickness of the lithium niobate substrate is 20 µm or less.

The present invention is an optical control element including an optical waveguide formed by using diffusion of titanium that is formed on a lithium niobate substrate and a control electrode formed on the lithium niobate substrate that is provided in the vicinity of the optical waveguide, in which an amount of a hydroxyl group absorbed into the lithium niobate substrate is set to be in a range of 0.5 to 2.5 $cm^{-1}$ in terms of absorption coefficient, and thus it becomes possible to provide an optical control element in which variation of MFD in the optical waveguide is small and an optical loss is suppressed.

DETAILED DESCRIPTION OF THE INVENTION

Hereinafter, an optical control element of the present invention will be described in detail using a preferred example. The optical control element of the present invention is an optical control element including an optical waveguide formed by using diffusion of titanium that is formed on a lithium niobate substrate and a control electrode formed on the lithium niobate substrate that is provided in the vicinity of the optical waveguide, in which an amount of a hydroxyl group absorbed into the lithium niobate substrate is set to be in a range of 0.5 to 2.5 $cm^{-1}$ in terms of absorption coefficient.

Particularly, in a case where a pattern width of a titanium film in at least any one of an input portion, an output portion, or an interaction portion with the control electrode of the optical waveguide is 6 μm or less or a thickness of the lithium niobate substrate is 20 μm or less, the present invention exhibits a particularly significant effect.

In order to confirm conditions of a manufacturing process of the optical control element of the present invention, the following experiment was carried out. As an LN substrate, a commercially available lithium niobate wafer (X plate, opt grade) having a diameter of four inches and a thickness of 0.5 mm was used. A pattern width of a titanium film that is formed on the LN substrate was set to 3.5 μm, 4.0 μm, 4.5 μm, 5.0 μm, 5.5 μm, 6.0 μm, 7.0 μm, and 8.0 μm, and a height of the Ti film was set to 1,000 angstroms. In order to thermally diffuse titanium on the LN substrate, a temperature in an electric furnace was set to 1,000° C., and titanium was diffused for 15 hours. A dew point in the electric furnace was set to 10° C., 30° C., and 50° C.

After an optical waveguide was formed on the LN substrate, the LN substrate was polished until a thickness of the LN substrate reached 20 μm.

Figure 1:
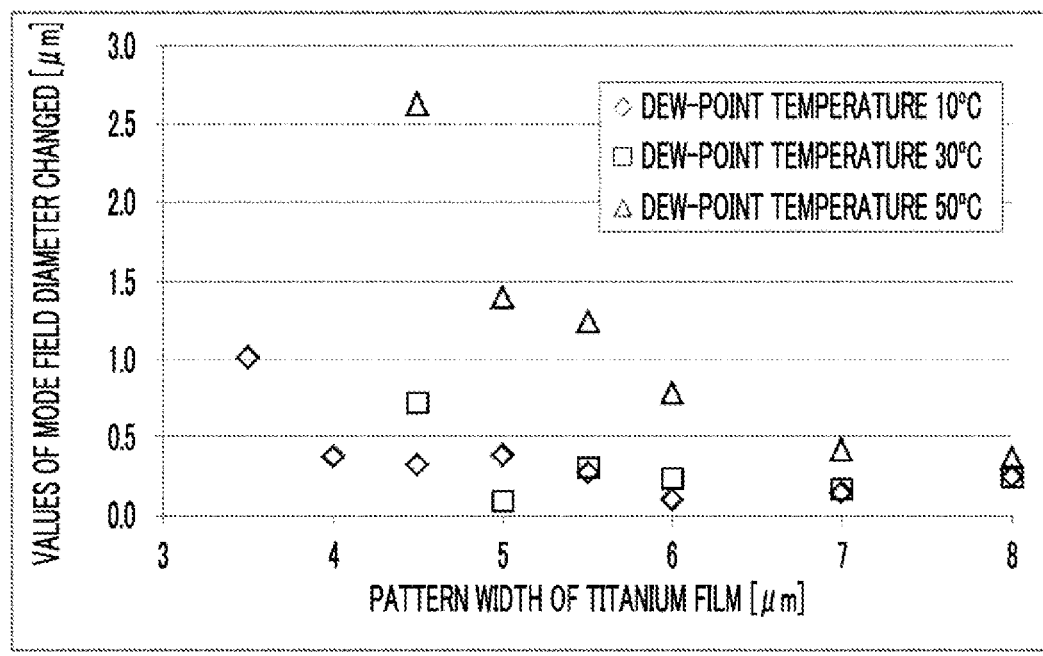
FIG. 1 is a graph showing changes in MFD with respect to pattern widths of titanium films.

Values of MFD changed with respect to the respective widths of the titanium film are shown in FIG. 1. Regarding the pattern width of the titanium film, an automatic line width measurement system (TARCYLS200) manufactured by Flovel Co., Ltd. was attached to an optical microscope (MX50) manufactured by Olympus Corporation, and the pattern width of the titanium film on the LN substrate before thermal diffusion was measured. The pattern width after thermal diffusion can also be measured using the present system, and a significant difference was not caused in the pattern width before and after thermal diffusion. MFD was measured at a wavelength of 1,550 nm using a high-performance near field pattern (NFP) measurement optical system (M-Scope type S) manufactured by Synergy Optosystems Co., Ltd.

The values of MFD changed with respect to the respective titanium widths are shown in FIG. 1. When FIG. 1 is referenced, it is easily understood that the values of MFD changed significantly change depending on the dew-point temperature. It is found that, in a case where the dew-point temperatures are 10° C. and 30° C., relatively close values appear; however, at a dew-point temperature of 50° C., there is a tendency that the values significantly deviate from the values at the dew-point temperatures of 30° C. and the like.

In addition, in a case where the titanium width is 6 μm or less, the values of MFD changed become large, and, particularly, in a case where the titanium width is 6 μm or less and the dew-point temperature is 50° C., there is a tendency that the values of MFD changed become excessively large. From the above-described fact, it has been clarified that, in a case where the amount of moisture included in the process gas is great (the dew-point temperature is 50° C.), in an optical waveguide in which the width (the pattern width of the titanium film) is 6 μm or less, the extension of the titanium concentration distribution in the horizontal direction is accelerated, which results in the extension of MFD.

Meanwhile, in another experiment, it is confirmed that, in a case where the process gas includes almost no moisture (the dew-point temperature is −20° C. or lower), when a titanium film is thermally diffused, pattern peeling or surface degradation is caused, and the titanium film does not sufficiently function as an optical waveguide.

Therefore, in the case of an optical waveguide in which the pattern width of the titanium film is 6 μm or less, it is effective to set the amount of moisture included in the process gas to a dew-point temperature of 0° C. or higher and lower than 50° C. for the stabilization of MFD. Particularly, it is preferable to set the amount to approximately 10° C., for example, in a range of 0° C. to 20° C.

Next, the amounts of hydroxyl groups absorbed into the LN substrate in the case of being treated at the respective dew-point temperatures were measured. Among the specimens used in the above-described experiment, for the three samples for which the dew-point temperature in the electric furnace was set to 10° C., 30° C., and 50° C. and, separately, the sample that was treated at a dew-point temperature of −20° C. or lower, the amounts of hydroxyl groups absorbed were measured.

Figure 2:
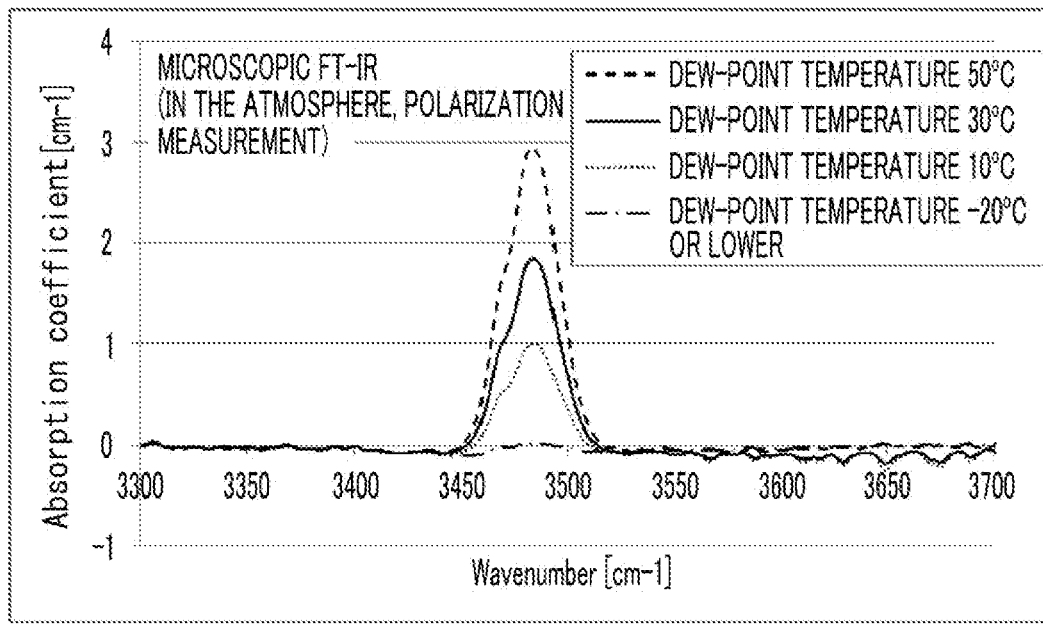
FIG. 2 is a graph showing measurement results using microscopic FT-IR.

The amount of a hydroxyl group absorbed was measured by a transmission method using a microscopic FT-IR (Hyperion-3000/Tensor 27 manufactured by Bruker Japan K.K.). Regarding the measurement conditions, the specimen was disposed in the atmosphere, and polarization in a direction perpendicular to a crystal axis (c axis) was measured using a polarizer. FIG. 2 is a spectral spectrum showing the amounts of hydroxyl groups absorbed in terms of absorption coefficient.

When FIG. 2 is referenced, it is easily understood that, as the dew-point temperature increases from −20° C. to 50° C., the amount of a hydroxyl group in the LN substrate changes in a range of 0 $cm^{-1}$ to 3 $cm^{-1}$. As described above, the dew-point temperature is preferably 0° C. or higher and lower than 50° C., and thus it is easily understood that the amount of a hydroxyl group absorbed into the LN substrate after the diffusion of titanium is preferably 0.5 to 2.5 $cm^{-1}$ in terms of absorption coefficient.

Meanwhile, regarding a thickness of the LN substrate, in a case in which the thickness of the substrate is set to 20 μm or less, the pattern width of the titanium film that becomes a single mode reaches 6 μm or less, and thus the present invention is more preferably applied to LN substrates having a thickness of 20 μm or less.

As described above, according to the present invention, it is possible to provide an optical control element in which variation of MFD is suppressed and an optical loss is small.

What is claimed is:

1. An optical control element comprising:
    an optical waveguide formed by using diffusion of titanium that is formed on a lithium niobate substrate; and
    a control electrode formed on the lithium niobate substrate that is provided in the vicinity of the optical waveguide,
    wherein a thickness of the lithium niobate substrate is 20 μm or less,
    a pattern width of a titanium film in at least any one of an input portion, an output portion, or an interaction portion with the control electrode of the optical waveguide is 6 μm or less, and
    an amount of a hydroxyl group absorbed into the lithium niobate substrate is set to be in a range of 1.0 to 2.0 $cm^{-1}$ in terms of absorption coefficient.

* * * * *